US009045118B2

(12) United States Patent
Taguchi et al.

(10) Patent No.: US 9,045,118 B2
(45) Date of Patent: Jun. 2, 2015

(54) TRAVEL CONTROL DEVICE

(75) Inventors: Koji Taguchi, Isehara (JP); Koji Nakai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 711 days.

(21) Appl. No.: 12/673,249

(22) PCT Filed: Sep. 1, 2008

(86) PCT No.: PCT/JP2008/065684
§ 371 (c)(1),
(2), (4) Date: Feb. 12, 2010

(87) PCT Pub. No.: WO2009/031500
PCT Pub. Date: Mar. 12, 2009

(65) Prior Publication Data
US 2010/0211235 A1 Aug. 19, 2010

(30) Foreign Application Priority Data
Sep. 5, 2007 (JP) ................ 2007-230586

(51) Int. Cl.
*B60T 7/22* (2006.01)
*B60T 8/174* (2006.01)
(Continued)

(52) U.S. Cl.
CPC . *B60T 7/22* (2013.01); *B60T 8/174* (2013.01); *B60T 8/1755* (2013.01);
(Continued)

(58) Field of Classification Search
CPC ........... B60W 2520/14; B60W 2520/105; B60W 2520/402; B60W 2720/86; B60W 2720/103; B60W 10/06; B60W 10/184; B60W 10/20; B60W 30/09; B60W 30/10; B60W 2050/002; B60W 2050/0024; B60T 7/22; B60T 8/174; B60T 8/1755; B60T 8/17551; B60T 8/17557; B60T 2201/022; B60T 2230/02; B60T 2270/86; G05G 1/01; G05G 1/02; G05G 1/04; B62D 6/001; B62D 6/002; B62D 6/003; G08C 19/16; G08C 17/02; G08C 1/16; G08C 1/165; G08C 1/166; G01P 5/26; G01P 13/02; G01P 15/097; B60K 2350/1024; B60K 2350/1028; B60K 2350/2013; B60K 35/00; B60K 37/06; B60G 17/0195
USPC .................................... 701/11, 15, 13
See application file for complete search history.

(56) References Cited

U.S. PATENT DOCUMENTS 2,612,331 A * 9/1952 Frazier et al. ............ 244/188
2,754,055 A * 7/1956 Naylor ..................... 701/11
(Continued)

FOREIGN PATENT DOCUMENTS

EP  0 738 946 A1  10/1996
EP  1 302 356 A1   4/2003
(Continued)

OTHER PUBLICATIONS

On the Dyanmics of Automatic Gain Controllers, (Communication from the Central Laboratory of the Siemens & Haske AG Wernerwerk) K. kupfmuller, Elektrische Nachrichtentechnik, vol. 5, No. 11, 1928, pp. 459-467 Englich translation C.C. Bissell, Open University, UK, 2005.*

(Continued)

*Primary Examiner* — James Trammell
*Assistant Examiner* — James E Stroud
(74) *Attorney, Agent, or Firm* — Oliff PLC

(57) ABSTRACT

A travel control device which controls vehicle travel by feedback control so that the vehicle travels according to a travel plan is characterized by including: a control item determining unit that determines a prioritized control item for every position of a target locus in the travel plan; a control gain determining unit that sets a control gain of the determined prioritized control item to be higher than those of other control items; and a travel plan correction unit that includes the determined control gain in the travel plan.

2 Claims, 6 Drawing Sheets

(51) Int. Cl.
*B60T 8/1755* (2006.01)
*B60W 10/06* (2006.01)
*B60W 10/184* (2012.01)
*B60W 10/20* (2006.01)
*B60W 30/09* (2012.01)
*B60W 30/10* (2006.01)
*B60W 50/00* (2006.01)

(52) U.S. Cl.
CPC ...... *B60T 8/17557* (2013.01); *B60T 2201/022* (2013.01); *B60W 10/06* (2013.01); *B60W 10/184* (2013.01); *B60W 10/20* (2013.01); *B60W 30/09* (2013.01); *B60W 30/10* (2013.01); *B60W 2050/0022* (2013.01); *B60W 2050/0024* (2013.01); *B60W 2520/105* (2013.01); *B60W 2520/14* (2013.01); *B60W 2550/402* (2013.01); *B60W 2720/103* (2013.01)

(56) References Cited

U.S. PATENT DOCUMENTS

| | | | | |
|---|---|---|---|---|
| 3,011,738 | A | * | 12/1961 | Skramstad et al. ........... 244/190 |
| 3,848,833 | A | * | 11/1974 | Rauschelbach ............... 244/177 |
| 4,074,648 | A | * | 2/1978 | Reid et al. ............... 114/144 RE |
| 4,142,695 | A | * | 3/1979 | Remmell et al. ............. 244/3.14 |
| 5,870,303 | A | * | 2/1999 | Trovato et al. ................. 700/61 |
| 6,016,457 | A | | 1/2000 | Toukura et al. |
| 6,044,311 | A | * | 3/2000 | Larramendy et al. ........... 701/10 |
| 6,121,899 | A | * | 9/2000 | Theriault ...................... 340/967 |
| 6,507,776 | B1 | * | 1/2003 | Fox, III ........................... 701/11 |
| 6,943,701 | B2 | * | 9/2005 | Zeineh .......................... 340/988 |
| 7,098,810 | B2 | * | 8/2006 | Bateman et al. ............. 340/963 |
| 2003/0050742 | A1 | | 3/2003 | Sakamoto et al. |
| 2004/0199316 | A1 | * | 10/2004 | Kato et al. ...................... 701/41 |

FOREIGN PATENT DOCUMENTS

| | | | |
|---|---|---|---|
| GB | 2 353 872 A | | 3/2001 |
| JP | 11321690 A | * | 11/1999 |
| JP | A-11-321690 | | 11/1999 |
| JP | A-2000-177428 | | 6/2000 |
| JP | A-2000-272592 | | 10/2000 |
| JP | A-2003-26017 | | 1/2003 |
| JP | A-2004-268643 | | 9/2004 |
| JP | A-2006-160037 | | 6/2006 |

OTHER PUBLICATIONS

Translation of Mar. 30, 2010 International Preliminary Report on Patentability issued in International Application No. PCT/JP2008/065684.

Jan. 13, 2009 Search Report issued in International Application No. PCT/JP2008/065684.

European Search Report issued in Application No. 08828972.3; Dated Mar. 8, 2011.

\* cited by examiner

TRAVEL CONTROL DEVICE

TECHNICAL FIELD

The present invention relates to a travel control device which controls vehicle travel by feedback control so that the vehicle travels according to a travel plan.

BACKGROUND ART

In recent years, in order to reduce a burden on a driver, devices for giving various driving supports to the driver have been developed. For example, there is a device which detects a pair of white lines from an imaged image obtained by imaging the front side of a vehicle and which gives steering assist torque to a steering mechanism so that the vehicle travels along the center (target locus) of the lane formed by the pair of white lines (refer to Patent Citation 1). In steering control of this device, feedback control is performed. In this case, it is detected to what extent the actual vehicle position deviates from the target locus (that is, an error is detected), steering assist torque is calculated so that the error is decreased, and the steering assist torque is generated.

Patent Citation 1: Japanese Unexamined Patent Application Publication No. 11-321690

Patent Citation 2: Japanese Unexamined Patent Application Publication No. 2000-272592

Patent Citation 3: Japanese Unexamined Patent Application Publication No. 2000-177428

DISCLOSURE OF THE INVENTION

Technical Problem

In the case of performing feedback control in travel control of a vehicle, there is not only the position of the vehicle but also various control items, such as the speed, acceleration, direction, and yaw rate, and the control gain of the feedback control is set for each control item. In known feedback control, the control gain of each of the control items is constant, and the control is performed such that an error is reduced to approximately the same level for each control item. Moreover, in the known feedback control, the control gain at each position (point of time in a time series) in the target locus is constant, and the control is performed such that an error is reduced to approximately the same level for each position. Moreover, in such real-time feedback control of a vehicle, there is a limit in throughput. Accordingly, since there is a limit in the total amount of adjustment capability to eliminate an error, an error in each control item or each position can be reduced only to a certain level. Accordingly, for example, there is a possibility that a certain level of error will occur even at the position where an error of the lateral position or direction of a vehicle needs to be made as small as possible, the speed could not be sufficiently reduced even at the position where the speed needs to be sufficiently reduced, or sufficient yaw will not occur even at the position where large yaw needs to occur.

Therefore, it is an object of the present invention to provide a travel control device capable of performing highly precise travel control in the case of performing travel control of a vehicle by feedback control.

Technical Solution

A travel control device according to the present invention is a travel control device which controls vehicle travel by feedback control so that the vehicle travels according to a travel plan, and is characterized in that an allowable error amount of the feedback control or a magnitude relationship of a control gain of the feedback control is included in the travel plan.

In this travel control device, the allowable error amount of the feedback control or the magnitude relationship of the control gain (level for reducing an error of the vehicle state amount with respect to the control target value) of the feedback control is included in the travel plan. Accordingly, the allowable error amount or the control gain can be adjusted according to the vehicle state amount whose error needs to be reduced, the position where an error needs to be reduced, and the like. The travel control device performs feedback control so that the vehicle travels according to a travel plan in which such a control gain has been adjusted. As a result, an error of the vehicle state amount whose error needs to be reduced can be made smaller than those of the other vehicle state amounts, or an error at the position where an error needs to be reduced can be made smaller than those at the other positions. Thus, since the travel control device can make an error of the vehicle state amount, position, or the like which needs to be prioritized in traveling as small as possible, highly precise travel control can be performed. In addition, regarding a vehicle state amount, a position, and the like for which an error may be allowed to some extent other than the vehicle state amount or position for which an error needs to be reduced, it is possible to make the allowable error amount relatively high or to make the control gain relatively low. Accordingly, in the travel control device, the total amount of adjustment capability to eliminate an error in the whole system can be suppressed. As a result, feedback control is possible even with a relatively small throughput.

In addition, the travel plan is a concept which includes not only the target locus along which a vehicle travels but also a vehicle speed (forward and backward speed, lateral speed), vehicle acceleration (forward and backward acceleration, lateral acceleration), a vehicle direction, a yaw rate, and the like at each position (each point of time in a time series) of the target locus. Moreover, in the present invention, the travel plan is a concept including the allowable error amount or control gain of feedback control. The control gain is a level for reducing an error of the vehicle state amount with respect to the control target value, and feedback control can be performed such that the error decreases as the value of the control gain increases. Examples of a control item of the vehicle state amount include a forward and backward position, a lateral position, a forward and backward speed, a lateral speed, forward and backward acceleration, lateral acceleration, a yaw angle, and a yaw rate. Examples of the control gain include a gain regarding the forward and backward position, a gain regarding the lateral position, a gain regarding the forward and backward speed, a gain regarding the lateral speed, a gain regarding the forward and backward acceleration, a gain regarding the lateral acceleration, a gain regarding the yaw angle, and a gain regarding the yaw rate.

In the above-described travel control device of the present invention, the allowable error amount of the feedback control or the magnitude relationship of the control gain of the feedback control may be included in the travel plan for every control item in the feedback control.

In this travel control device, the allowable error amount or the control gain is set for every control item. Accordingly, since the allowable error amount or the control gain can be adjusted according to the vehicle state amount whose error needs to be reduced, an error of the vehicle state amount which is prioritized in traveling can be reduced.

In the above-described travel control device of the present invention, the allowable error amount of the feedback control or the magnitude relationship of the control gain of the feedback control may be included in the travel plan for every position of a target locus in the travel plan.

In this travel control device, the allowable error amount or the control gain is set for every position on the target locus along which the vehicle needs to pass in the future. Accordingly, since the allowable error amount or the control gain can be adjusted according to the position at which an error needs to be reduced, an error at the position which is prioritized in traveling can be reduced. In addition, each position of the target locus in the travel plan may be each point on the target locus or may be each point of time (each time) in a time series on the target locus.

A travel control device according to the present invention is a travel control device which controls vehicle travel by feedback control so that the vehicle travels according to a travel plan, and is characterized by including: a control item determining unit that determines a prioritized control item for every position of a target locus in the travel plan; a control gain determining unit that sets a control gain of the prioritized control item determined by the control item determining unit to be higher than those of other control items; and a travel plan correction unit that includes the control gain, which is determined by the control gain determining unit, in the travel plan.

In this travel control device, the control item determining unit determines a prioritized control item for every position of the target locus in the travel plan, and the control gain determining unit sets the control gain of the prioritized control item to be higher than those of the other control items. Moreover, in the travel control device, the travel plan correction unit makes the determined control gain included in the travel plan and performs feedback control so that the vehicle travels according to the travel plan. In this way, for every position on the target locus along which the vehicle needs to pass in the future, it is possible to adjust the control gain according to a control item (vehicle state amount) whose error needs to be reduced. As a result, the travel control device can make an error of the vehicle state amount, which needs to be reduced, smaller than those of the vehicle state amounts or can make an error at the position, at which an error needs to be reduced, smaller than those at the other positions. Thus, since the travel control device can make an error of the vehicle state amount, position, or the like which needs to be prioritized in traveling as small as possible, highly precise travel control can be performed. Moreover, in the travel control device, the control gain can be set to be relatively low for a control item or position for which an error is allowed to some extent. Accordingly, since the total amount of adjustment capability to eliminate an error in the whole system can be suppressed, feedback control is possible even with a relatively small throughput.

In addition, in order to make a control gain of a prioritized control item higher than those of the other control items, there is a case where the control gain of the prioritized control item is made high preferentially or a case where the control gains of the other control items are made lower than the control gain of the prioritized control item so that the control gain of the prioritized control item is made relatively high since the control gains of other control items can be made low.

In the above-described travel control device of the present invention, future time or distance of a first point on the target locus from a current vehicle position being small and future time or distance of a second point from the current vehicle position being larger than that of the first point and the control gain determining unit may set a control gain at the first point to be relatively lower than a control gain at the second point when a vehicle position and/or direction at the second point is higher in importance than a vehicle position and/or direction at the first point.

When the second point (point which is farther than the first point in terms of time or distance) on the target locus is higher than the first point in the importance in traveling (for example, when the clipping point which is more prioritized than other points in traveling on the curve road is the second point), the travel control device sets the control gain at the second point to be high so that the control gain at the first point is made relatively lower than the control gain at the second point. In this way, the error at the second point can be made smaller than that at the first point.

In the above-described travel control device of the present invention, when a vehicle performs emergency avoidance, the control gain determining unit may set a control gain of a control item regarding a high yaw rate and/or a low speed to be higher than those of other control items in an early stage of a time series from the start of the emergency avoidance to the end of the emergency avoidance and may set a control gain of a control item regarding high lateral acceleration and/or a high lateral speed to be higher than those of the other control items in a middle stage.

When emergency avoidance is needed since an obstacle has appeared suddenly ahead, it is important to avoid approaching the obstacle as much as possible or to change the direction to the vehicle in order to avoid the obstacle in the early stage of the time series from the start of the emergency avoidance to the end of the emergency avoidance. Accordingly, it is necessary to make the speed as low as possible or to generate the high yaw rate. Therefore, the travel control device sets the control gain of a control item regarding a high yaw rate or a low speed to be higher than those of the other control items in the early stage, so that the high yaw rate is generated in the vehicle or the speed of the vehicle is reduced. In a middle stage, it is important to move in the lateral direction in order to reliably avoid the obstacle. Accordingly, it is necessary to generate high lateral acceleration or lateral speed. Therefore, the travel control device generates high lateral acceleration or lateral speed in the vehicle by setting the control gain of a control item regarding high lateral acceleration or high lateral speed to be higher than those of the other control items in the middle stage, so that the vehicle moves quickly in the lateral direction.

In the above-described travel control device of the present invention, the control gain determining unit may set a control gain of a control item regarding a proper lateral position and/or a proper speed to be higher than those of the other control items in a final stage of the time series from the start of the emergency avoidance to the end of the emergency avoidance.

In the final stage of the time series from the start of the emergency avoidance to the end of the emergency avoidance, it is important to travel along the adjacent lane after the movement in the lateral direction and at a speed according to the relationship with front and rear vehicles, a speed limit, and the like. Accordingly, it is necessary to have a proper lateral position or a proper speed along the lane. Therefore, the travel control device sets the control gain of a control item regarding the proper lateral position or proper speed to be higher than those of the other control items in the final stage, so that the vehicle travels at the proper lateral position or proper speed in a lane to which the vehicle is to move.

Advantage of the Invention

In the present invention, highly precise travel control can be performed since the allowable error amount or control gain of feedback control can be adjusted according to the vehicle control amount whose error needs to be reduced, a position at which an error needs to be reduced, or the like.

EXPLANATION OF REFERENCES

Figure 1:
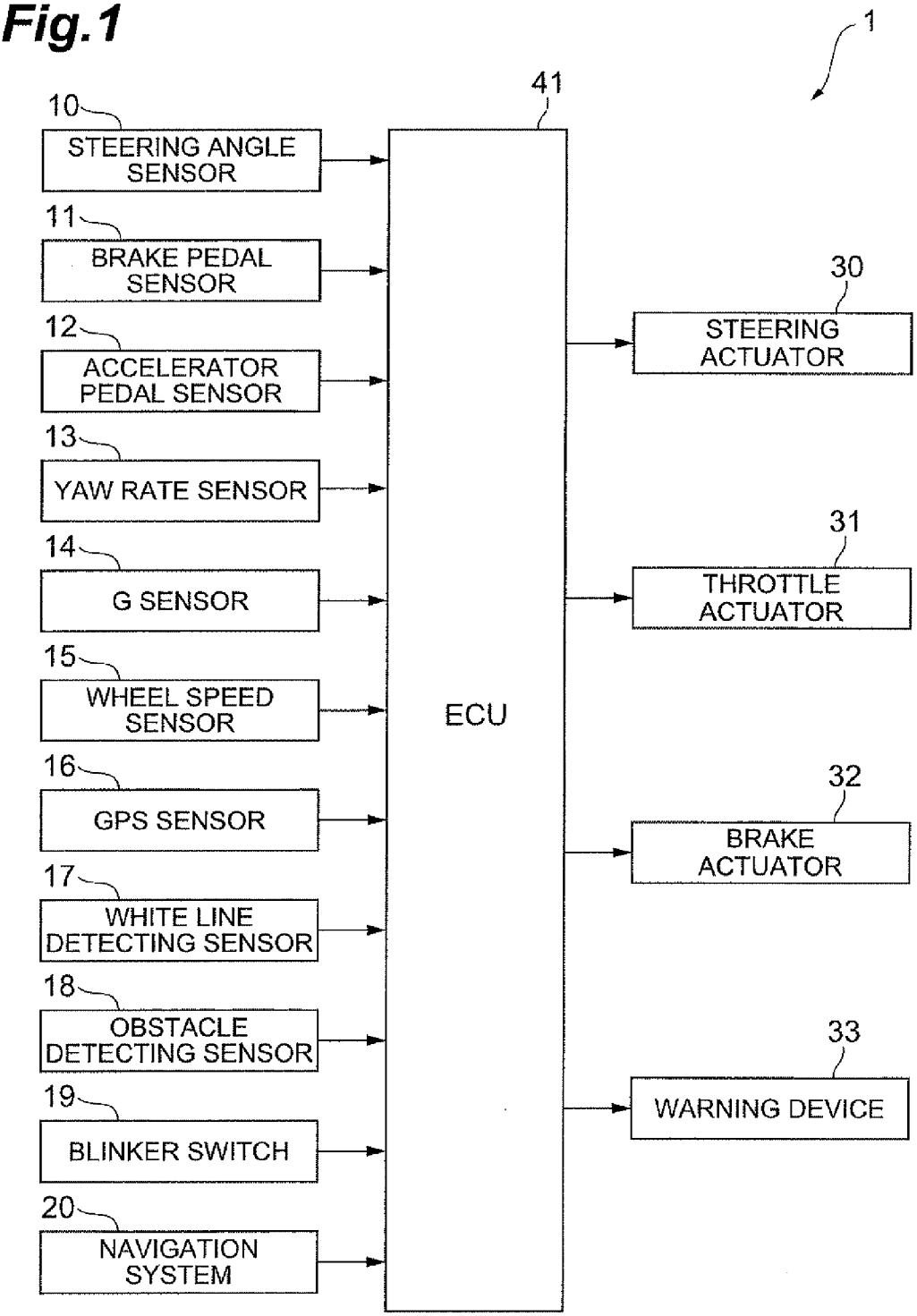
FIG. 1 is a view showing the configuration of an emergency avoidance device according to a first embodiment.

1: EMERGENCY AVOIDANCE DEVICE
2: AUTOMATIC DRIVING DEVICE
10: STEERING ANGLE SENSOR
11: BRAKE PEDAL SENSOR
12: ACCELERATOR PEDAL SENSOR
13: YAW RATE SENSOR
14: G SENSOR
15: WHEEL SPEED SENSOR
16: GPS SENSOR
17: WHITE LINE DETECTION SENSOR
18: OBSTACLE DETECTING SENSOR
19: BLINKER SWITCH
20: NAVIGATION SYSTEM
30: STEERING ACTUATOR
31: THROTTLE ACTUATOR
32: BRAKE ACTUATOR
33: WARNING DEVICE
41, 42: ECU

BEST MODE FOR CARRYING OUT THE INVENTION

Hereinafter, embodiments of a travel control device according to the present invention will be described with reference to the drawings.

There are two forms in the present embodiment. The first embodiment is a form applied to an emergency avoidance device, and the second embodiment is a form applied to an automatic driving device. The emergency avoidance device according to the first embodiment generates a travel plan for emergency avoidance lane change when an obstacle (a falling object, an accident vehicle, a disabled vehicle, or the like) appears suddenly ahead of a vehicle during manual driving of the driver, and performs vehicle movement control so that the vehicle travels according to the travel plan. The automatic driving device according to the second embodiment generates an optimal travel plan and performs vehicle movement control so that the vehicle travels according to the travel plan.

In addition, the travel plan includes not only a target locus (lateral position and forward and backward position of a vehicle in a time series) but also control items, such as a vehicle speed (forward and backward speed, lateral speed), vehicle acceleration (forward and backward acceleration, lateral acceleration), a yaw angle, and a yaw rate at each position of the target locus or each point of time in a time series and the control gain of each control item. Examples of the control gain includes a forward and backward position deficiency gain and a forward and backward excess gain regarding a forward and backward position, a lateral position deficiency gain and a lateral position excess gain regarding a lateral position, a forward and backward speed deficiency gain and a forward and backward speed excess gain regarding a forward and backward speed, a lateral speed deficiency gain and a lateral speed excess gain regarding a lateral speed, a forward and backward acceleration deficiency gain and a forward and backward acceleration excess gain regarding forward and backward acceleration, a lateral acceleration deficiency gain and a lateral acceleration excess gain regarding lateral acceleration, a yaw angle deficiency gain and a yaw angle excess gain regarding a yaw angle, and a yaw rate deficiency gain and a yaw rate excess gain regarding a yaw rate. In addition, the plus and minus values of the control gain do not need to be equal. In addition, the excess gain is a gain for reducing the actual value when the actual value is larger than the target value. The deficiency gain is a gain for increasing the actual value when the actual value is smaller than the target value.

Figure 2:
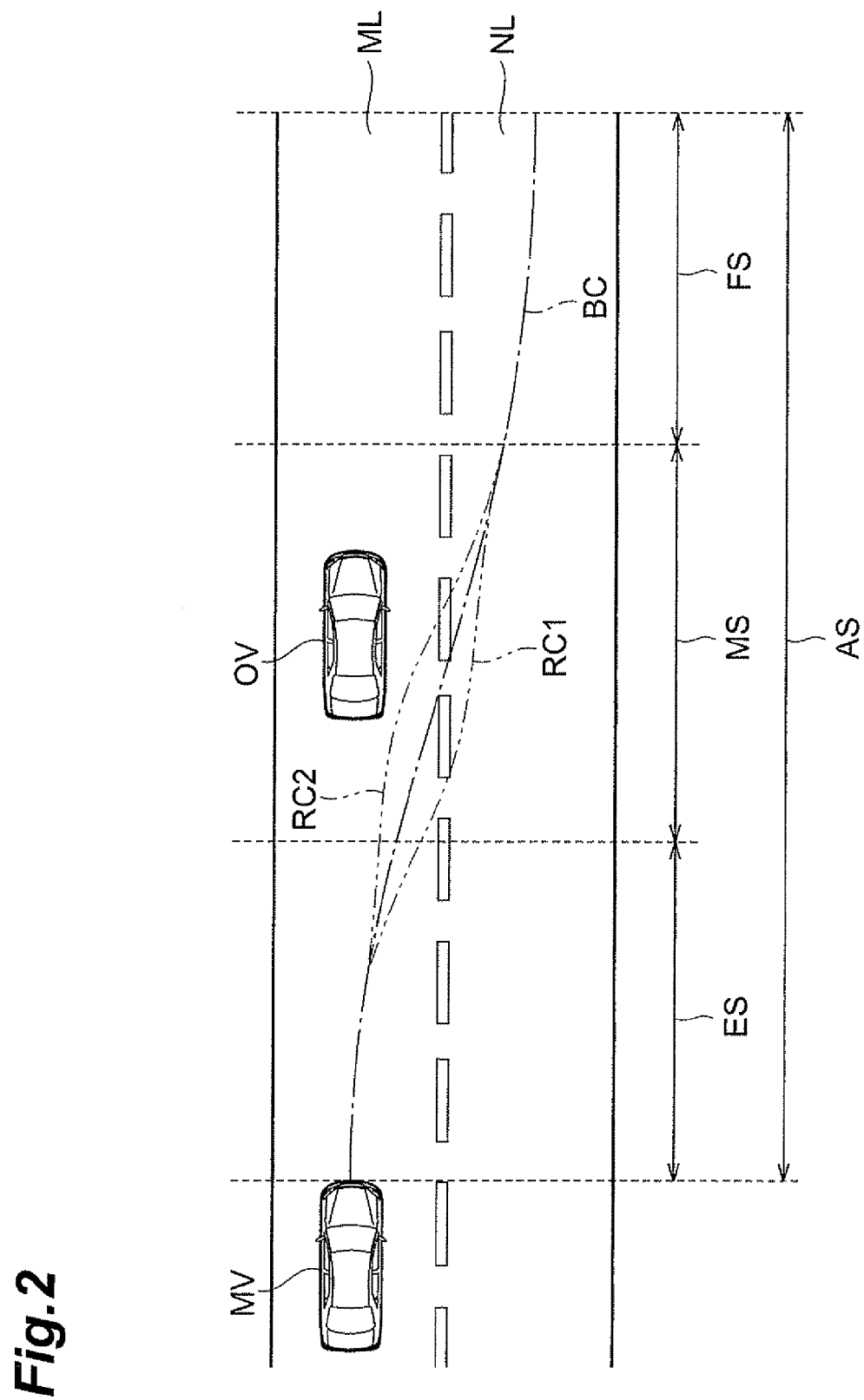
FIG. 2 is an example of the avoidance target locus for lane change at the time of emergency avoidance.

An emergency avoidance device 1 according to the first embodiment will be described with reference to FIGS. 1 and 2. FIG. 1 is a view showing the configuration of the emergency avoidance device according to the first embodiment. FIG. 2 is an example of the avoidance target locus for lane change at the time of emergency avoidance.

When an obstacle appears ahead of a vehicle during manual driving of the driver, the emergency avoidance device 1 performs emergency avoidance by lane change if it is not possible to avoid the obstacle by emergency deceleration. In order to do so, the emergency avoidance device 1 generates an avoidance target locus for lane change in a travel plan and performs vehicle movement control so that the vehicle travels along the avoidance target locus for lane change. In particular, the emergency avoidance device 1 sets the control gain of a control item, which is prioritized according to each situation of an early stage, a middle stage, and a final stage in the emergency avoidance lane change, to be relatively higher than those of other control items and regenerates an avoidance target locus for lane change according to the control gain of each of the control items.

In order to do so, the emergency avoidance device 1 includes a steering angle sensor 10, a brake pedal sensor 11, an accelerator pedal sensor 12, a yaw rate sensor 13, a G sensor 14, a wheel speed sensor 15, a GPS sensor 16, a white line detecting sensor 17, an obstacle detecting sensor 18, a blinker switch 19, a navigation system 20, a steering actuator 30, a throttle actuator 31, a brake actuator 32, a warning device 33, and an ECU [Electronic Control Unit] 41. Moreover, in the first embodiment, each processing of the ECU 41 is equivalent to a control item determining unit, a control gain determining unit, and a travel plan correction unit described in the appended claims.

Referring to FIG. 2, a control item, which is prioritized when performing lane change due to emergency avoidance, will be described. When a vehicle OV, which has stopped in an accident or the like, exists ahead of a vehicle MV during manual driving of the driver, the vehicle MV needs to avoid the vehicle OV by lane change from a driving lane ML to an adjacent lane NL if it is not possible to avoid the vehicle OV by deceleration.

In the early stage ES (for example, a period until a point of ⅓ in an avoidance target locus for lane change) of the lane change, it is important to make the vehicle MV avoid approaching the vehicle OV as much as possible or to change the direction to a direction in which the vehicle MV performs the lane change. Accordingly, in the early stage ES, a speed (those lower than target speed and target deceleration are preferentially controlled) and a yaw rate (those higher than the target yaw rate are preferentially controlled) are set as prioritized control items.

In the middle stage MS (for example, a period from $1/3$ to $2/3$ in the avoidance target locus for lane change) of the lane change, it is important for the vehicle MV to move in a lateral direction in order to reliably avoid the vehicle OV. Accordingly, in the middle stage MS, lateral acceleration (a high one is preferentially controlled) and a lateral speed (a high one is preferentially controlled) are set as prioritized control items.

In the final stage FS (for example, a period after a point of $2/3$ in the avoidance target locus for lane change) of the lane change, it is important that the vehicle MV travels along the lane NL after the lane change or the vehicle MV travels at the proper speed in consideration of the relationship with other vehicles which travel in the lane NL, the control speed, and the like. Accordingly, in the final stage FS, a speed (speed almost equal to other vehicles in the lane NL or speed limit) and a lateral position (position along the centerline of the lane NL) are set as prioritized control items.

In addition, control items other than the prioritized control items are control items for which an error may be allowed to some extent. Since a control gain can be made low for the control items, a control gain of the prioritized control item can be made high. As a result, it is possible to suppress the total amount of adjustment capability to eliminate an error in the emergency avoidance device 1.

The steering angle sensor 10 is a sensor which detects the steering angle input from the handle by the driver. The steering angle sensor 10 detects a steering angle and transmits the steering angle to the ECU 41 as a steering angle signal.

The brake pedal sensor 11 is a sensor which detects the amount of operation of a brake pedal operated by the driver. The brake pedal sensor 11 detects the amount of operation of a brake pedal and transmits the amount of operation to the ECU 41 as a brake operation amount signal.

The accelerator pedal sensor 12 is a sensor which detects the amount of operation of an accelerator operated by the driver. The accelerator pedal sensor 12 detects the amount of operation of an accelerator and transmits the amount of operation to the ECU 41 as an accelerator operation amount signal.

The yaw rate sensor 13 is a sensor which detects the yaw rate generated in the vehicle. The yaw rate sensor 13 detects the yaw rate and transmits the yaw rate to the ECU 41 as a yaw rate signal.

The G sensor 14 is a sensor which detects the lateral acceleration or forward and backward acceleration acting on the vehicle. The G sensor 14 detects the acceleration acting on the vehicle and transmits the acceleration to the ECU 41 as a G signal. In addition, a lateral G sensor and a longitudinal G sensor are configured for every acceleration detected.

The wheel speed sensor 15 is a sensor which is provided in four wheels of the vehicle and detects the rotating speed (the number of pulses corresponding to the rotation of a wheel) of the wheel. The wheel speed sensor 15 detects the rotation pulse number of a wheel every predetermined time and transmits the detected wheel rotation pulse number to the ECU 41 as a wheel speed signal. The ECU 41 calculates a wheel speed from the rotating speed of each wheel and calculates a vehicle body speed (vehicle speed) from the wheel speed of each wheel.

The GPS sensor 16 includes a GPS antenna or a processor, and is a sensor which estimates the position of a vehicle. In the GPS sensor 16, the GPS antenna receives a GPS signal from a GPS satellite. Moreover, in the GPS sensor 16, the processor demodulates the GPS signal and calculates the position of the vehicle on the basis of the demodulated position data of each GPS satellite. In addition, the GPS sensor 16 transmits to the ECU 41 a GPS information signal indicating the position of the vehicle. Moreover, in order to calculate the current position, the position data of three or more GPS satellites is needed. Accordingly, the GPS sensor 16 receives GPS signals from three or more different GPS satellites.

The white line detecting sensor 17 includes a camera or an image processor, and is a sensor which detects a pair of white lines (lane). In the white line detecting sensor 17, the camera images a front road of the vehicle. Moreover, in the white line detecting sensor 17, the image processor recognizes a pair of white lines, which shows the lane along which the vehicle travels, from the imaged image. In addition, the lane width, a line passing through the center of the pair of white lines (that is, a centerline of the lane), the radius (curve radius R) from the center of the lane, the curve curvature $\gamma$ ($=1/R$) from the curve radius R, the direction (yaw angle) of the vehicle with respect to the white lines, the position (offset) of the vehicle center with respect to the center of the lane, and the like are calculated from the pair of recognized white lines. In addition, the white line detecting sensor 17 transmits the information on the pair of recognized white lines or the calculated information to the ECU 41 as a white line detection signal.

The obstacle detecting sensor 18 includes a millimeter wave radar or a processor, and is a sensor which detects an obstacle (vehicle or the like) which exists ahead of the vehicle. In the obstacle detecting sensor 18, the millimeter wave radar illuminates a millimeter wave ahead and receives a millimeter wave which returns by reflection on an object. In addition, in the obstacle detecting sensor 18, the processor detects whether or not an obstacle is present on the basis of the transmitted and received data of a millimeter wave, and calculates a distance to the obstacle when the obstacle has been detected. The obstacle detecting sensor 18 transmits the information on the detected obstacle or the calculated information to the ECU 41 as an obstacle detection signal.

The blinker switch 19 is a switch for inputting a direction instruction (right direction instruction ON, left direction instruction ON and OFF) of the driver. The blinker switch 19 transmits the blinker operation information of the driver to the ECU 41 as a blinker signal.

The navigation system 20 is a system which detects the current position of the vehicle and guides the course to the destination. In particular, the navigation system 20 reads the shape information of the current driving road from the map database and transmits the road shape information to the ECU 41 as a navigation signal. In addition, in the case of a vehicle which does not include a navigation system, it may be configured to include at least a map database in which at least the road shape information is stored or may be configured to acquire the road shape information using communication between a road and a vehicle or the like.

The steering actuator 30 is an actuator for transmitting the rotational driving force of a motor to a steering mechanism (a rack, a pinion, a column, and the like) through a deceleration mechanism and for giving the steering assist torque to the steering mechanism. In the steering actuator 30, when a steering control signal is received from the ECU 41, a motor is rotatably driven according to the steering control signal to thereby generate steering assist torque.

The throttle actuator 31 is an actuator which adjusts the opening ratio of a throttle valve. When an engine control signal is received from the ECU 41, the throttle actuator 31 operates according to the engine control signal and adjusts the opening ratio of a throttle valve.

The brake actuator 32 is an actuator which adjusts the brake hydraulic pressure of a wheel cylinder. When a brake control signal is received from the ECU 41, the throttle actuator 32 operates according to the brake control signal and adjusts the brake hydraulic pressure of a wheel cylinder.

The warning device 33 is a device which outputs a warning sound for telling the driver about the emergency avoidance lane change. When a warning signal is received from the ECU 41, the warning device 33 outputs a warning signal if the warning signal is an ON signal and stops outputting a warning signal if the warning signal is an OFF signal.

The ECU 41 includes a CPU [Central Processing Unit], a ROM [Read Only Memory], a RAM [Random Access Memory], and the like and is an electronic control unit which performs overall control of the emergency avoidance device 1. The ECU 41 receives a signal from each of the sensors 10 to 18, a signal from the blinker switch 19, and a signal from the navigation system 20 every fixed time interval. In addition, the ECU 41 monitors the appearance of an obstacle every fixed time interval. When an obstacle appears, the ECU 41 transmits a control signal to each of the actuators 30 to 32 or to the warning device 33 in order to perform emergency avoidance braking or emergency avoidance lane change.

The ECU 41 determines whether or not an obstacle exists within the emergency avoidance required distance ahead of the vehicle MV, every fixed time interval, on the basis of an obstacle detection signal from the obstacle detecting sensor 18. The emergency avoidance required distance is a distance threshold value for determining whether or not the emergency avoidance is required since the obstacle has come too close, and is set beforehand by experiments or the like. The emergency avoidance required distance is set as a variable value according to the current vehicle speed of the vehicle MV.

When an obstacle exists within the emergency avoidance required distance, the ECU 41 determines whether or not it is possible to avoid the obstacle by deceleration of the vehicle MV (that is, whether or not the vehicle can stop safely in front of the obstacle) on the basis of the distance from the obstacle, the current vehicle speed of the vehicle MV, and the like. When it is determined that it is possible to avoid the obstacle by deceleration, the ECU 41 generates a brake control signal required for the deceleration and transmits the brake control signal to the brake actuator 32.

When it is determined that it is not possible to avoid the obstacle by deceleration, the ECU 41 determines that an emergency avoidance lane change is required and transmits a warning signal, in which an ON signal for outputting a warning sound is set, to the warning device 33 in order to signal that the emergency avoidance lane change should be performed by control on the vehicle side. Moreover, in order to confirm the intention of the driver to change lanes, the ECU 41 determines whether or not there has been a steering operation in the lane change direction on the basis of the steering angle signal from the steering angle sensor 10 or whether or not there has been a blinker operation in the lane change direction on the basis of the blinker signal from the blinker switch 19. When there is no steering operation or blinker operation in the lane change direction, the ECU 41 transmits a warning signal for outputting a warning sound again to the warning device 33.

When there is a steering operation or a blinker operation in the lane change direction, the ECU 41 determines that the driver has shown the intention to carry out emergency avoidance by lane change and transmits a warning signal, in which an OFF signal for stopping the output of a warning sound is set, to the warning device 33. In addition, the ECU 41 generates the avoidance target locus for lane change as a reference and a speed pattern under lane change on the basis of the distance to the obstacle, the current vehicle speed of the vehicle MV, and the like. This generation method may be generated by any method. For example, an avoidance target locus for avoidable lane change is generated by enlarging and reducing the lane change locus, which is prepared beforehand in the ECU 41, in the longitudinal direction according to the distance from the obstacle or the like, and a speed pattern for performing deceleration is generated when there is a friction allowance of a tire from the estimated coefficient of road surface friction. An example of the avoidance target locus BC (one-dot chain line) for lane change as a reference is shown in FIG. 2. The total length AS of the avoidance target locus BC for lane change in the vehicle traveling direction is adjusted by the distance from the obstacle and the like.

Then, the ECU 41 sets the control gain of feedback control for each control item in the early stage of the lane change. A forward and backward speed excess gain for setting of a low speed and a yaw rate deficiency gain for generating the high yaw rate are set as gains made high. A forward and backward speed deficiency gain, a lateral speed excess gain, and a lateral acceleration excess gain are set as gains neglected. Other gains are set as gains made low.

In addition, the ECU 41 sets the control gain of feedback control for each control item in the middle stage of the lane change. A lateral acceleration deficiency gain and a lateral speed deficiency gain for movement in the lateral direction are set as gains made high. A forward and backward speed deficiency gain is set as a gain neglected. Other gains are set as gains made low.

In addition, the ECU 41 sets the control gain of feedback control for each control item in the final stage of the lane change. A forward and backward speed excess gain and a forward and backward speed deficiency gain for setting of a proper speed (for example, for setting the speed of a front vehicle in a lane after lane change as a target speed) and a lateral position avoidance excess gain and a lateral position avoidance deficiency gain for setting of a proper lateral position (for example, a centerline of a lane after lane change) are set as gains made high. Other gains are set as gains made low.

In addition, regarding the specific value of a control gain, the appropriate gain value at the time of normal traveling is set as the average value. Moreover, in the case of increasing the control gain, for example, a value corresponding to twice the average value is set. In the case of decreasing the control gain, for example, a value corresponding to ½ of the average value is set. In the case of neglecting the control gain, for example, 0 is set.

In addition, the ECU 41 regenerates an avoidance target locus for lane change and a speed pattern from the avoidance target locus for lane change and the speed pattern used as references according to the control gain of each control item at each position of the avoidance target locus for lane change. As a specific example, in the early and middle stages in which the control gain regarding the lateral position is not high, there is a high possibility that a lateral position error of the vehicle MV will be large, and therefore, the safety distance from the obstacle is set to be larger than normal. For example, assuming that a normal TTC [Time To Collision] is 1 second, the TTC is changed to 2 seconds and regenerated. FIG. 2 shows an avoidance target locus RC1 for lane change at the time of regeneration closer to the safety side and an avoidance target locus RC2 for lane change at the time of regeneration closer to the attack side regarding the avoidance target locus BC for lane change as a reference.

If such a travel plan is generated, the ECU 41 estimates the vehicle state amounts (forward and backward position, lateral position, forward and backward speed, lateral speed, forward and backward position acceleration, lateral acceleration, yaw angle, yaw rate, and the like) on the basis of a signal from each of the sensors 13 to 17 every fixed time. In addition, the ECU 41 sets a control target value corresponding to each position of the vehicle MV in the forward and backward direction (each position of the vehicle MV in the traveling direction) in the avoidance target locus for lane change. The control target value is a value corresponding to each of the vehicle state amounts. For example, a target forward and backward speed is set for the forward and backward speed.

Moreover, the ECU 41 calculates a target traveling direction accelerating force in the traveling direction of the vehicle MV using the control gain, the vehicle state amount, and the control target value regarding the forward and backward direction (traveling direction) by Expression (1).

[Expression 1]

Target traveling direction accelerating force=forward and backward speed excess gain×(actual forward and backward speed−target forward and backward speed)×(if (actual forward and backward speed>target forward and backward speed) 1 else 0)+forward and backward speed deficiency gain× (target forward and backward speed−actual forward and backward speed)×(if (actual forward and backward speed<target forward and backward speed) 1 else 0)+forward and backward acceleration excess gain×(actual forward and backward acceleration−target forward and backward acceleration)×(if (actual forward and backward acceleration>target forward and backward acceleration) 1 else 0)+forward and backward acceleration deficiency gain×(target forward and backward acceleration−actual forward and backward acceleration)×(if (actual forward and backward acceleration<target forward and backward acceleration) 1 else 0)   (1)

In addition, the ECU 41 calculates a target lateral direction accelerating force in the lateral direction of the vehicle MV using the control gain, the vehicle state amount, and the control target value regarding the lateral direction by Expression (2).

[Expression 2]

Target lateral direction accelerating force=lateral position avoidance excess gain×(actual lateral position−target lateral position)×(if (actual lateral position>target lateral position) 1 else 0)+lateral position avoidance deficiency gain×(target lateral position−actual lateral position)×(if (actual lateral position<target lateral position) 1 else 0)+lateral speed excess gain×(actual lateral speed−target lateral speed)×(if (actual lateral speed>target lateral speed) 1 else 0)+lateral speed deficiency gain×(target lateral speed−actual lateral speed)×(if (actual lateral speed<target lateral speed) 1 else 0)+lateral acceleration excess gain×(actual lateral acceleration−target lateral acceleration)×(if (actual lateral acceleration>target lateral acceleration) 1 else 0)+lateral acceleration deficiency gain×(target lateral acceleration−actual lateral acceleration)× (if (actual lateral acceleration<target lateral acceleration) 1 else 0)   (2)

In addition, the ECU 41 calculates a target yaw moment for the yaw rate of the vehicle MV using the control gain, the vehicle state amount, and the control target value regarding the yaw rate by Expression (3).

[Expression 3]

Target yaw moment=yaw rate excess gain×(actual yaw rate−target yaw rate)×(if (actual yaw rate>target yaw rate) 1 else 0)+yaw rate deficiency gain×(target yaw rate−actual yaw rate)×(if (actual yaw rate<target yaw rate) 1 else 0)   (3)

In addition, the ECU 41 generates a steering control signal, an engine control signal, and a brake control signal for the target traveling direction accelerating force, the target lateral direction accelerating force, and the target yaw moment by a vehicle movement control method and transmits the control signals to the steering actuator 30, the throttle actuator 31, and the brake actuator 32, respectively. Any control method may be used as the vehicle movement control method.

Moreover, in the above-described feedback control, an example has been shown in which the control gain is set or the target traveling direction accelerating force, the target lateral direction accelerating force, and the target yaw moment are calculated in a state where the P control is assumed. However, regarding the feedback control, any control may be used. For example, PID control is used.

Figure 3:
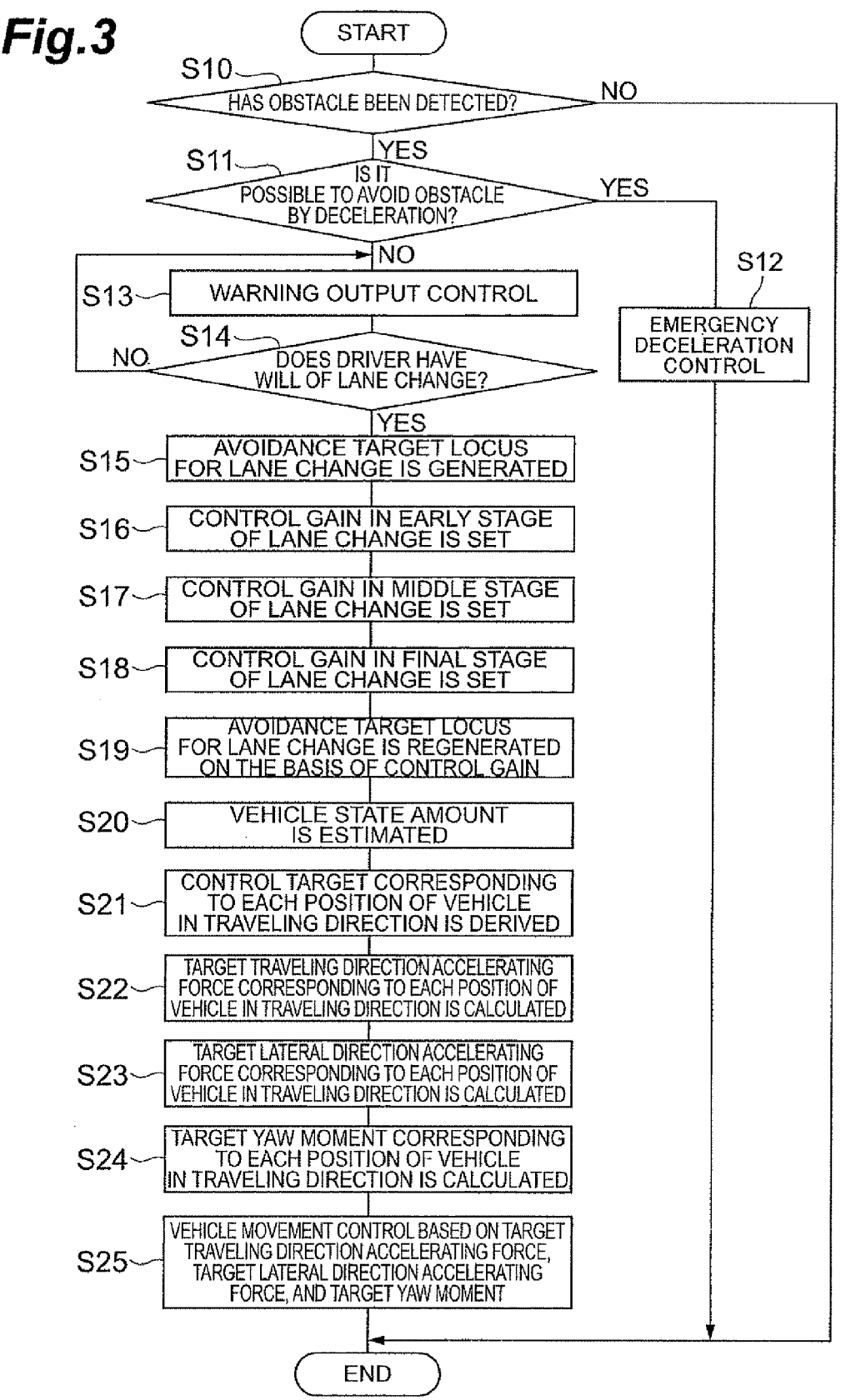
FIG. 3 is a flow chart showing the flow of processing in an ECU of FIG. 1.

Next, an operation in the emergency avoidance device 1 will be described with reference to FIGS. 1 and 2. Particularly, processing in the ECU 41 will be described according to the flow chart of FIG. 3. FIG. 3 is a flow chart showing the flow of the processing in the ECU of FIG. 1.

The steering angle sensor 10 detects the steering angle based on a steering operation of a driver and transmits the steering angle signal to the ECU 41. The brake pedal sensor 11 detects the amount of operation based on a brake operation of the driver and transmits the brake operation amount signal to the ECU 41. The accelerator pedal sensor 12 detects the amount of operation based on an accelerator operation of the driver and transmits the accelerator operation amount signal to the ECU 41. The yaw rate sensor 13 detects the yaw rate occurring in the vehicle MV and transmits the yaw rate signal to the ECU 41. The G sensor 14 detects the acceleration acting on the vehicle and transmits the G signal to the ECU 41. The wheel speed sensor 15 of each wheel detects the rotation pulse number of a wheel and transmits the wheel speed signal to the ECU 41. The GPS sensor 16 receives a GPS signal from each GPS satellite, calculates the current position and the like of the vehicle MV on the basis of the GPS signals of three or more GPS satellites, and transmits the GPS information signal to the ECU 41. The white line detecting sensor 17 images the front of the vehicle MV, detects a pair of white lines on the basis of the imaged image and calculates the information indicating the relationship between the white lines and the vehicle MV, and transmits the white line detection signal to the ECU 41. The obstacle detecting sensor 18 performs transmission and reception of a millimeter wave using a millimeter wave radar, detects whether or not an obstacle exists and calculates the distance to the obstacle and the like on the basis of the transmitted and received data of the millimeter wave, and transmits the obstacle detection signal to the ECU 41. The blinker switch 19 transmits the blinker operation information of the driver to the ECU 41 as a blinker signal. The navigation system 20 transmits the shape information of the current driving road to the ECU 41 as a navigation signal.

During normal traveling based on a manual operation of the driver, the ECU 41 determines whether or not an obstacle, emergency avoidance from which is needed, exists ahead of the vehicle MV on the basis of the detection result of the obstacle detecting sensor 18 every fixed time (S10). When it is determined that there is no obstacle in S10, the normal traveling based on the manual operation of the driver is continued.

When it is determined that there is an obstacle in S10, the ECU 41 determines whether or not it is possible to avoid the obstacle by deceleration and stopping on the basis of the distance to the obstacle, the current speed, and the like (S11). When it is determined that it is possible to avoid the obstacle safely by deceleration and stopping in S11, the ECU 41 generates a brake control signal for the stopping and transmits the brake control signal to the brake actuator 32 (S12). When the brake control signal is received, the brake actuator 32 generates the brake hydraulic pressure corresponding to the brake control signal in a wheel cylinder of each wheel. As a result, the vehicle MV decelerates by a predetermined brake force and stops ahead of the obstacle.

When it is determined that it is not possible to avoid the obstacle by deceleration in S11, the ECU 41 generates a warning signal for outputting a warning sound and transmits the warning signal to the warning device 33 (S13). When the warning signal is received, the warning device 33 outputs the warning sound. The driver notices by the warning sound that the vehicle is trying to perform the lane change by emergency avoidance. In addition, the driver shows the intention of lane change by performing a steering operation or blinker operation in the lane change direction.

The ECU 41 determines whether or not the driver has shown the intention of lane change on the basis of the detection result of the brake pedal sensor 11 or the operation on the blinker switch 19 (S14). When it is determined that the driver has not shown the intention of lane change in S14, the ECU 41 transmits a warning signal to the warning device 33 again (S13). Then, the warning device 33 outputs a warning sound again.

When it is determined that the driver has shown the intention of lane change in S14, the ECU 41 generates an avoidance target locus for lane change and a speed pattern as references (S15). In addition, the ECU 41 sets each control gain in the early stage of the lane change for controlling the low speed and the high yaw rate preferentially (S16). In addition, the ECU 41 sets each control gain in the middle stage of the lane change for controlling the high lateral acceleration and the high lateral speed preferentially (S17). In addition, the ECU 41 sets each control gain in the final stage of the lane change for controlling the proper speed and the proper lateral position preferentially (S18). Moreover, the ECU 41 regenerates an avoidance target locus for lane change and a speed pattern on the basis of each control gain at each position in the lane change, and generates a travel plan (S19).

The ECU 41 estimates the vehicle state amount on the basis of the detection result of each of the sensors 13 to 17 every fixed time (S20). In addition, the ECU 41 derives a control target value corresponding to each position of the vehicle MV in the traveling direction in the avoidance target locus for lane change (S21). Moreover, the ECU 41 calculates a target traveling direction accelerating force corresponding to each position in the traveling direction using the control gain, the vehicle state amount, and the control target value regarding the traveling direction by Expression (1) (S22). Moreover, the ECU 41 calculates a target lateral direction accelerating force corresponding to each position in the traveling direction using the control gain, the vehicle state amount, and the control target value regarding the lateral direction by Expression (2) (S23). Moreover, the ECU 41 calculates a target yaw moment corresponding to each position in the traveling direction using the control gain, the vehicle state amount, and the control target value regarding the yaw rate by Expression (3) (S24).

In addition, the ECU 41 generates a steering control signal, an engine control signal, and a brake control signal for the target traveling direction accelerating force, the target lateral direction accelerating force, and the target yaw moment and transmits the control signals to the steering actuator 30, the throttle actuator 31, and the brake actuator 32, respectively (S25). When the steering control signal is received, the steering actuator 30 gives steering assist torque corresponding to the steering control signal to the steering mechanism, such that a turning wheel is steered. In addition, when the engine control signal is received, the throttle actuator 31 performs adjustment to the opening ratio of a throttle valve corresponding to the engine control signal, such that the engine output is changed. In addition, when the brake control signal is received, the brake actuator 32 generates the brake hydraulic pressure corresponding to the brake control signal in a wheel cylinder of each wheel, such that the brake force is changed.

Then, the vehicle MV travels along the avoidance target locus for lane change within a certain amount of error, thereby performing the lane change while avoiding an obstacle. Particularly in the early stage of the lane change, the speed of the vehicle MV sufficiently drops and a large yaw rate occurs in the lane change direction. As a result, the vehicle MV can change the direction while securing the distance from the obstacle. In the middle stage of the lane change, large lateral speed and lateral acceleration occur in the lane change direction in the vehicle MV. As a result, the vehicle MV moves to the adjacent lane while avoiding the obstacle. In the final stage of the lane change, the vehicle MV travels at the proper speed corresponding to the speed of the front vehicle in a lane after the lane change and also travels at the proper lateral position along the center of the lane.

According to the emergency avoidance device 1, an error of a control item (vehicle state amount) whose error needs to be reduced according to each situation of the emergency avoidance lane change can be made small by adjusting each control gain according to a control item which needs to be prioritized (whose error needs to be reduced) for every position (point of time in a time series) in the traveling direction of lane change (that is, by performing weighting of the level for reducing an error of each control target value according to the situation of emergency avoidance lane change). As a result, highly efficient and highly precise emergency avoidance lane change can be performed.

Moreover, according to the emergency avoidance device 1, the control gain is set to be relatively low for a control item for which an error is allowed to some extent. Accordingly, since the total amount of adjustment capability to eliminate an error in the whole system can be suppressed, feedback control is possible even with a relatively small throughput.

In the emergency avoidance device 1, it is possible to perform correction to the avoidance target locus for lane change or speed pattern, which is more optimal, by setting each control gain according to each position in the traveling direction of lane change.

Figure 4:
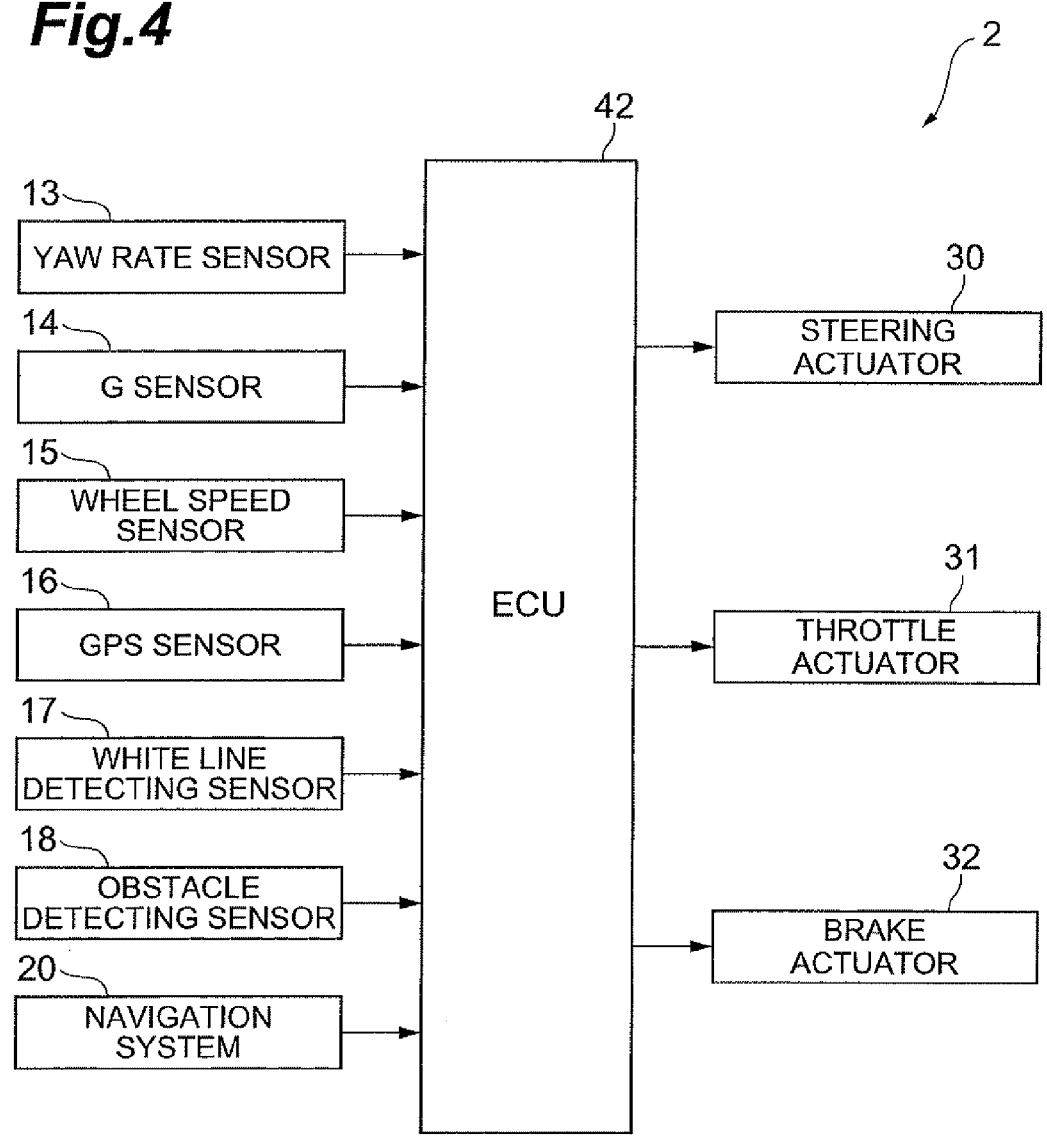
FIG. 4 is a view showing the configuration of an automatic driving device according to a second embodiment.
Figure 5:
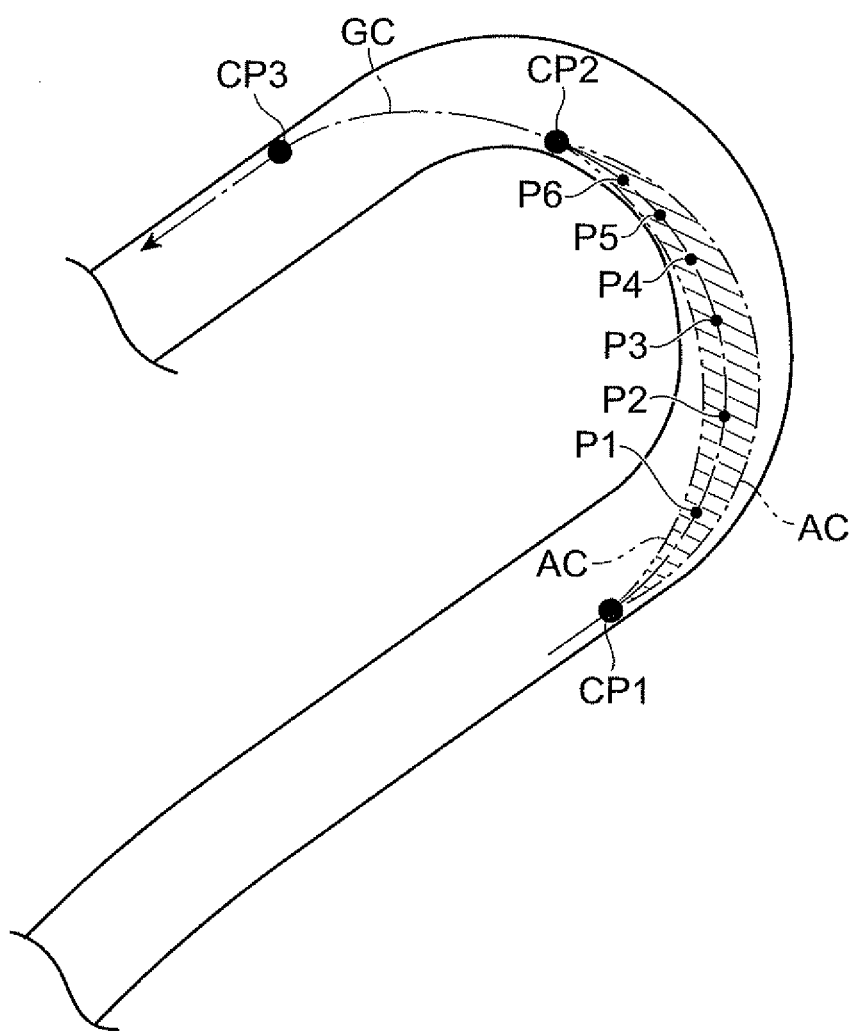
FIG. 5 is an example of a restriction limit neighboring point (clipping point) and a target locus in a curve road.

Referring to FIGS. 4 and 5, an automatic driving device 2 according to a second embodiment will be described. FIG. 4 is a view showing the configuration of the automatic driving device according to the second embodiment. FIG. 5 is an example of a restriction limit neighboring point (clipping point) and a target locus in a curve road. Moreover, in the automatic driving device 2, the same reference numerals are given to the same components as in the emergency avoidance device 1 according to the first embodiment; and an explanation thereof will be omitted.

The automatic driving device 2 generates an optimal target locus (travel plan) and performs vehicle movement control so that the vehicle travels along the target locus. In particular, the automatic driving device 2 sets a control gain of a position prioritized in traveling to be relatively higher than those of the other positions and performs the vehicle movement control according to the control gain of each of the positions. In addition, although engine control, brake control, and steering control are performed in the vehicle movement control of the automatic driving device 2, only the steering control will be described below in order to simplify the explanation.

In order to do so, the automatic driving device 2 includes a yaw rate sensor 13, a G sensor 14, a wheel speed sensor 15, a GPS sensor 16, a white line detecting sensor 17, an obstacle detecting sensor 18, a navigation system 20, a steering actuator 30, a throttle actuator 31, a brake actuator 32, and an ECU 42. Moreover, in the second embodiment, each processing of the ECU 42 is equivalent to a control item determining unit, a control gain determining unit, and a travel plan correction unit described in the appended claims.

A restriction limit neighboring point will be described with reference to FIG. 5. The restriction limit neighboring point is a singular point which barely satisfies the constraint in optimization processing (optimal control target), and is a point through which a vehicle needs to pass in a state where an error of each vehicle state amount (especially, position, direction, and the like) during traveling is made as small as possible. Examples of the restriction limit neighboring point include a point (point of time) at which the engine output reaches the maximum, a point (point of time) at which full brake is performed, and a point (point of time) adjacent to a road boundary line. By making a vehicle travel preferentially along the restriction limit neighboring point, the maximum performance of the vehicle can be derived. As a result, traveling without traveling problems, such as traveling deviation, becomes possible. To the contrary, if an error of the vehicle position, direction, or the like becomes large at the restriction limit neighboring point, a traveling problem, such as traveling deviation, occurs.

For example, in the case of traveling on a curve road, a skilled driver travels on the curve road in a way of out-in-out. This point is generally called a clipping point and is a point at which the target locus is in contact with the borderline of the road. By passing through the clipping point in an appropriate direction, it is possible to travel on the curve road smoothly. In the case of the example shown in FIG. 5, a clipping point CP1 at the outer side at the entrance of the curve road, a clipping point CP2 at the inner side near the peak of the curve road, and a clipping point CP3 at the outer side at an exit of the curve road are shown. On the curve road, it is a priority that the positional accuracy or vehicle direction at the three clipping points CP1, CP2, and CP3 on a target locus GC matches the target value. Regarding the position or direction at other points P1, P2, P3, . . . on the target locus GC, it is allowed that an error occurs more or less for the target value. In addition, two-dot chain lines AC and AC on both the left and right sides of the target locus GC are lines indicating the maximum allowable range in traveling. For safety reasons, it also becomes the minimum requirements to pass through the inside of the two lines AC and AC for the other points P1, P2, P3, . . . on the target locus GC.

In addition, points other than the prioritized points are points for which an error may be allowed to some extent. Since a control gain of each control item at these points can be made low, a control gain of a control item at a prioritized point can be made high. As a result, it is possible to suppress the total amount of adjustment capability to eliminate an error in the automatic driving device 2.

The ECU 42 includes a CPU, a ROM, a RAM, and the like and is an electronic control unit which performs overall control of the automatic driving device 2. The ECU 42 receives a signal from each of the sensors 13 to 18 and a signal from the navigation system 20 every fixed time. In addition, the ECU 42 generates an optimal travel plan, and transmits a control signal to each of the actuators 30 to 32 for traveling according to the travel plan.

The ECU 42 generates an optimal control target (target locus (vehicle position), direction, and the like with respect to time) such that an evaluation function (for example, a pass time) becomes the minimum. Any method may be used as the generation method. For example, an optimal locus generation technique is used. For the optimal locus generation technique, refer to "theoretical study on the shortest-time cornering method (first report 4WD-4WS vehicles)": by Fujioka Kimura Society of Automotive Engineers of Japan, collection papers Vol. 23, No. 2 (1992), pp. 75-80.

Then, the ECU 42 extracts a restriction limit neighboring point from the optimal control target (target locus). Any method may be used as the extraction method. For example, in the case of calculating a portion (clipping point) which travels on the end of a road with respect to the road boundary, a point with a high evaluation value is set as a restriction limit neighboring point using an inner point penalty function method for an optimizing plan calculated by an outer point penalty function method which is generally known in the optimization method. For example, refer to "optimization and its application": ISBN 4-901683-34-9.

Then, the ECU 42 performs vehicle movement control (especially, steering control) such that an error of a vehicle position, direction, or the like is made as small as possible for a restriction limit neighboring point in the target locus. In the second embodiment, in order to simplify the explanation, the control gain of feedback control is set to 0 for points other than the restriction limit neighboring point (that is, feedback control of these points is not performed). Moreover, for the control gain of each control item of the restriction limit neighboring point, the gain may be uniformly set to be high. In particular, it is preferable to set the control gains of vehicle position and direction to be higher than the other control gains.

Specifically, the ECU 42 sets only the restriction limit neighboring point as an object of feedback control, and performs feed forward control at all points in the target locus and also performs front gaze model steering control (feedback control) based on the front gaze distance (variable value) to the restriction limit neighboring point. The front gaze model steering control is a steering control for matching with the front position of the front gaze distance.

First, in order to perform the feed forward control, the ECU 42 generates a steering control signal so as to become an optimal control target value and transmits the steering control signal to the brake actuator 32 every fixed time.

Then, in order to perform the feedback control on the restriction limit neighboring point, the ECU 42 estimates the vehicle state amount on the basis of the signal from each of the sensors 13 to 17 every fixed time. Then, the ECU 42 calculates the distance (front gaze distance) from the current vehicle position to the next restriction limit neighboring point. In addition, the ECU 42 performs the feedback control by general front gaze model steering control, on the basis of the front gaze distance. In this feedback control, a distance between the front restriction limit neighboring point and a point on the extending line in the forward and backward direction (traveling direction) of the vehicle MV is calculated, and PID control is performed such that the distance becomes 0. The distance between the restriction limit neighboring point and the point on the extending line is a value in which differences from the control target values regarding the control items (yaw angle, lateral position, curved condition (curvature) of a road, and the like) at the restriction limit neighboring point are entirely included.

Figure 6:
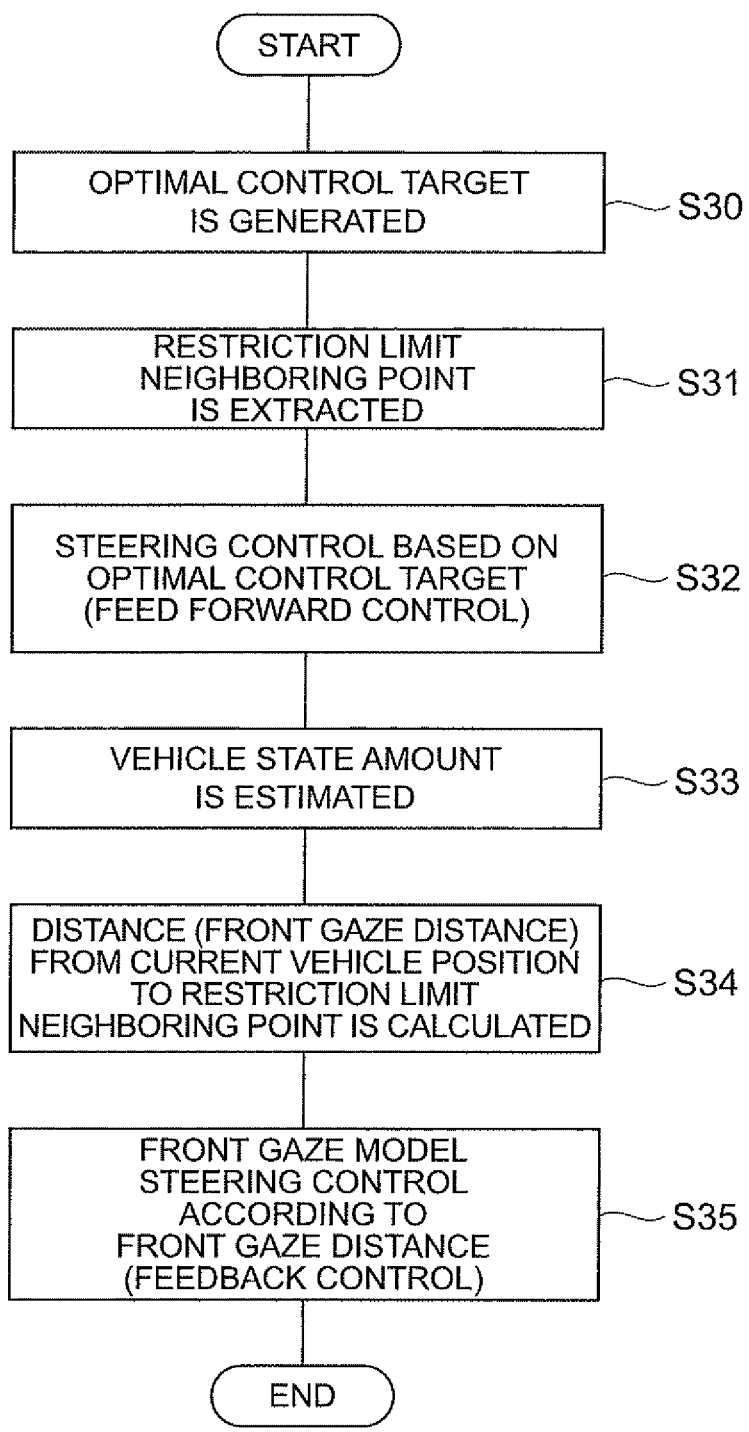
FIG. 6 is a flow chart showing the flow of processing in an ECU of FIG. 4.

Next, an operation in the automatic driving device 2 will be described with reference to FIGS. 4 and 5. Particularly, processing in the ECU 42 will be described according to the flow chart of FIG. 6. FIG. 6 is a flow chart showing the flow of the processing in the ECU of FIG. 4.

Each of the sensors 13 to 18 and the navigation system 20 perform the same operations as those described in the first embodiment.

When the automatic driving device 2 starts, the ECU 42 generates an optimal control target (a target locus (vehicle position), a direction, a speed pattern, and the like) as a travel plan of automatic driving (S30). Then, the ECU 42 extracts a restriction limit neighboring point from the target locus (S31). This determines a point (point of time in a time series) at which a control gain is set to be high and a point at which a control gain is set to 0, and a travel plan in which the control gain is included in the optimal control target is regenerated.

The ECU 42 generates a steering control signal on the basis of the optimal control target and transmits the steering control signal to the steering actuator 30 every fixed time (S32). When the steering control signal is received, the steering actuator 30 gives steering assist torque corresponding to the steering control signal to the steering mechanism, such that a turning wheel is steered. As a result, the vehicle MV is steering-controlled to become an optimal control target of each point by feed forward control.

In addition, the ECU 42 estimates the vehicle state amount on the basis of the detection result of each of the sensors 13 to 17 (S33). Then, the ECU 42 calculates the front gaze distance from the current vehicle position to the next restriction limit neighboring point (S34). Then, the ECU 42 generates a steering control signal, by the front gaze model steering control based on the front gaze distance, such that an error of each control item, such as a vehicle position or direction of the next restriction limit neighboring point, is made as small as possible and transmits the steering control signal to the steering actuator 30 (S35). When the steering control signal is received, the steering actuator 30 gives steering assist torque corresponding to the steering control signal to the steering mechanism, such that a turning wheel is steered.

Accordingly, an error in the optimal control target, such as a vehicle position or direction, becomes very small at the restriction limit neighboring point, and the error in the optimal control target, such as a vehicle position or direction, becomes large to some extent at points other than the restriction limit neighboring point. As a result, the vehicle MV travels on the curve road or the like smoothly and quickly.

According to the automatic driving device 2, an error at the restriction limit neighboring point can be made as small as possible by adjusting the control gain on the basis of a restriction limit neighboring point prioritized on the target locus (by performing feedback control only on the restriction limit neighboring point). As a result, it is possible to perform optimal (fastest) automatic driving by making full use of the performance of the vehicle.

Moreover, according to the automatic driving device 2, the control gain is set to be relatively low (control gain is set to 0) for a point at which an error is allowed to some extent. Accordingly, since the total amount of adjustment capability to eliminate an error in the whole system can be suppressed, feedback control is possible even with a relatively small throughput.

Having described the embodiments of the present invention, the present invention is not limited to those embodiments and is executed in various forms.

For example, although a configuration in which one ECU was used was adopted in the present embodiment, ECUs for steering control, engine control, brake control, and the like may be separately formed.

Moreover, although a plurality of sensors was used to estimate the vehicle state amounts in the present embodiment, only some of the sensors may be used or other sensors may be used.

Moreover, in the first embodiment, the present invention was applied to the emergency avoidance device for avoiding an obstacle when the obstacle appeared during manual driving. However, the present invention may also be applied to other apparatuses, such as an automatic driving device. Moreover, as a scene, the present invention may be applied not only to emergency avoidance but also to other traveling scenes, such as curve road traveling.

Moreover, although the present invention was applied to the automatic driving device in the second embodiment, the present invention may also be applied to other apparatuses, such as an automatic steering device and a lane keeping device.

Moreover, in the second embodiment, in order to reduce the error at the restriction limit neighboring point, the feedback control was performed using the front gaze distance. However, it is also possible to perform another feedback control which does not use the front gaze distance.

Moreover, in the second embodiment, the control gain was set to 0 (feedback control was not performed) for points other than the clipping point during curve traveling. However, the control gains of points other than the clipping point may be set to be relatively smaller than that of the clipping point (feedback control may be performed by reducing the control gain also for points other than the clipping point).

The invention claimed is:
1. A travel control device which controls vehicle travel by feedback control so that the vehicle travels according to a travel plan, wherein a target locus comprises a plurality of positions of the vehicle in a time series which the vehicle needs to pass in a future, the travel plan includes the target locus and vehicle state amount at each point included in the target locus, a plurality of control items are the vehicle state amount of an object of feedback control, a control gain of the feedback control is set in the plurality of control items respectively, the control gain is a level for trying to reduce an error of the actual vehicle state amount with respect to a control target value, the feedback control can be performed such that the error decreases as a value of the control gain increases, and the feedback control is performed such that the error of the actual vehicle state amount with respect to the control target value decreases using the control gain of the plurality of control items, the travel control device comprising:
 a control item determining unit that determines a prioritized control item among the plurality of control items for each of the plurality of positions of the vehicle of the target locus in the time series, the plurality of positions includes an early stage and a middle stage;
 a control gain determining unit that sets the control gain of the prioritized control item determined by the control item determining unit to be higher than the control gain of other control items among the plurality of control items; and
 a travel plan correction unit that includes the control gain determined by the control gain determining unit in the travel plan,
 wherein, for each of the plurality of positions of the vehicle of the target locus in the time series, the error with respect to the control target value of the prioritized control item is further decreased than the error with respect to the control target value of the other control items by increasing the control gain while allowing the error with respect to the control target value of other control item to increase due to the decrease of the control gain, when the vehicle performs emergency avoidance, the control gain determining unit sets the control gain of the prioritized control item regarding a high yaw rate and/or a low speed to be higher than the control gain of other control items in the early stage of the time series from a start of the emergency avoidance to an end of the emergency avoidance and sets the control gain of the prioritized control item regarding a high lateral acceleration and/or a high lateral speed to be higher than the control gain of the other control items in the middle stage of the time series, and the control item regarding the high yaw rate is the control item for generating a high yaw rate in order to change direction of the vehicle to avoid an obstacle, the control item regarding the low speed is the control item for reducing speed of the vehicle to avoid approaching an obstacle, the control item regarding the high lateral acceleration is for generating a high lateral acceleration for moving the vehicle in a lateral direction to avoid an obstacle without fail, and the control item regarding the lateral speed is for generating a high lateral speed for moving the vehicle in a lateral direction to avoid an obstacle without fail.

2. The travel control device according to claim 1, wherein the plurality of positions further includes a final stage, the control gain determining unit sets the control gain of the control item regarding a proper lateral position and/or a proper speed to be higher than the control gain of the other control items in the final stage of the time series from the start of the emergency avoidance to the end of the emergency avoidance, and the control item regarding the proper lateral position is for setting the vehicle at a proper lateral position required when traveling along an adjacent lane after the movement in the lateral direction to avoid the obstacle and the control item regarding the proper speed is for the vehicle to travel at a proper speed required when travelling along the adjacent lane after the movement in the lateral direction.

* * * * *